United States Patent
Hatano et al.

(10) Patent No.: US 7,924,688 B2
(45) Date of Patent: Apr. 12, 2011

(54) OPTICAL PICKUP AND MANUFACTURING METHOD FOR OPTICAL PICKUP

(75) Inventors: Shinya Hatano, Osaka (JP); Kazuhiro Takahashi, Osaka (JP); Hiromasa Sasaoka, Osaka (JP); Ryozo Hosoda, Osaka (JP)

(73) Assignee: Funai Electric Co., Ltd., Osaka (JP)

(*) Notice: Subject to any disclaimer, the term of this patent is extended or adjusted under 35 U.S.C. 154(b) by 692 days.

(21) Appl. No.: 11/905,626

(22) Filed: Oct. 2, 2007

(65) Prior Publication Data

US 2008/0095019 A1  Apr. 24, 2008

(30) Foreign Application Priority Data

Oct. 3, 2006 (JP) ................. 2006-271568

(51) Int. Cl.
*G11B 7/135* (2006.01)
(52) U.S. Cl. ................................. 369/112.24
(58) Field of Classification Search .............. None
See application file for complete search history.

(56) References Cited

U.S. PATENT DOCUMENTS

| | | | |
|---|---|---|---|
| 2002/0101799 A1* | 8/2002 | Nishikawa | 369/44.23 |
| 2002/0135893 A1* | 9/2002 | Hirose et al. | 359/819 |
| 2005/0007906 A1* | 1/2005 | Horinouchi et al. | 369/44.37 |
| 2006/0018214 A1 | 1/2006 | Fujii et al. | |
| 2008/0056101 A1* | 3/2008 | Hatano | 369/112.24 |

FOREIGN PATENT DOCUMENTS

| | | |
|---|---|---|
| EP | 1 612 778 A2 | 1/2006 |
| JP | A-H6-168456 | 6/1994 |
| JP | A-2000-322756 | 11/2000 |
| JP | A-2006-064886 | 3/2006 |
| WO | WO 2005/004128 | 1/2005 |

* cited by examiner

*Primary Examiner* — Daniell L Negrón
*Assistant Examiner* — Henok Heyi
(74) *Attorney, Agent, or Firm* — Morgan, Lewis & Bockius LLP (57) ABSTRACT

An optical pickup includes a first objective lens, a second objective lens having a numerical aperture different from that of the first objective lens, and an objective lens holder that holds the objective lenses. The first objective lens is attached to the objective lens holder via a spacer. The objective lens holder has a first fixture hole that receives the spacer with the first objective lens and a second fixture hole that receives the second objective lens. The first fixture hole is provided with a spacer supporting portion in which the spacer is inserted in a rotatable manner.

13 Claims, 10 Drawing Sheets

Fig.8A rank of spacer

| angle of elements \ rank | 1 | 2 | 3 | 4 | 5 |
|---|---|---|---|---|---|
| spacer ($\gamma$) | 0-r1 | r1-r2 | r2-r3 | r3-r4 | r4- |

Fig.8B rank of objective lens holder

| angle of elements \ rank | 1 | 2 | 3 | 4 | 5 |
|---|---|---|---|---|---|
| objective lens holder ($\theta$) | 0-q1 | q1-q2 | q2-q3 | q3-q4 | q4- |

OPTICAL PICKUP AND MANUFACTURING METHOD FOR OPTICAL PICKUP

This application is based on Japanese Patent Application No. 2006-271568 filed on Oct. 3, 2006, the contents of which are hereby incorporated by reference.

BACKGROUND OF THE INVENTION

1. Field of the Invention

The present invention relates to an optical pickup that projects a laser beam onto an optical disc for reproducing or recording information. In particular, the present invention relates to an optical pickup having lenses with different numerical apertures for recording or reproducing information on a CD, a DVD and a BD, as well as a manufacturing method of the optical pickup.

2. Description of Related Art

An optical disc apparatus records or reproduce information on the optical disc as a recording medium by projecting a laser beam onto the optical disc from the optical pickup. If the optical disc apparatus supports a CD (Compact Disc) medium and a DVD (Digital Versatile Disc) medium, the optical pickup is equipped with a laser light source that emits infrared laser (having a wavelength of approximately 780 nm) for a CD and red laser (having a wavelength of approximately 650 nm) for a DVD. In addition, the optical pickup is equipped with an objective lens that condenses the laser beam to make a circular laser spot on a track formed on a recording surface of the optical disc.

A diameter of the laser spot is proportional to a wavelength of the laser beam and is inversely proportional to a numerical aperture (NA) of the objective lens. Since a width of the track of the CD medium is different from that of the DVD medium, the diameter of the laser spot for recording or reproducing information is also different between the two media. Therefore, two objective lenses having different numerical apertures are necessary. However, a single objective lens can support both the CD medium and the DVD medium by modifying a shape of the objective lens.

In addition, the optical pickup includes an objective lens holder that holds the objective lens. The objective lens holder is moved in a radial direction (tracking direction) of the CD medium or the DVD medium, and in the direction approaching to or separating from the media (focusing direction). This movement enables the laser beam to be projected on the track of the optical disc accurately.

Recently in addition, a BD (Blu-Ray Disc) has become available, which has the same diameter as the DVD and larger storage capacity than the DVD. Since a BD medium has higher recording density than the DVD medium, a track width of the BD medium is much smaller than that of the DVD medium. Further, the laser spot for the BD should be smaller, too. Therefore, a laser light source that emits blue laser having a shorter wavelength (approximately 405 nm) than the red laser is used for recording or reproducing information on the BD medium.

On the other hand, the objective lens for a CD/DVD has a small NA that cannot condense the blue laser sufficiently, so it is difficult to use it for recording or reproducing information on the BD medium correctly. Furthermore, if an objective lens for a BD is used, it is difficult to condense the infrared laser or the red laser appropriately. Therefore, it is proposed to provide two objective lenses having different numerical apertures, i.e., an objective lens for a CD/DVD and an objective lens for a BD to the lens holder that holds the objective lens.

Using such an optical pickup provided with two objective lenses having different numerical apertures, the laser beam can be projected onto the optical discs having different track widths accurately so that recording and reproducing of information can be performed accurately.

In the case of the above-mentioned optical pickup having two different objective lenses, even if the optical pickup is adjusted so that the optical axis of the laser beam becomes orthogonal to a recording surface of the optical disc with respect to a tilt angle of one of the objective lenses, the optical axis of the laser beam going out from the other objective lens is not always orthogonal to the recording surface of the optical disc. It is because that a tilt error of the objective lens when it is attached to the lens holder, a shape error of the attaching portion, or the like is not always the same between the both objective lenses.

Therefore, the objective lens is rotated around its central axis in the objective lens holder so that adjustment of a tilt of the objective lens (tilt angle adjustment) can be performed in many cases. In this case, before the objective lens is fixed to the objective lens holder, the objective lens is rotated for the adjustment of a tilt angle (see JP-A-2000-322756 for example).

However, the objective lens is usually formed to have no bump or dip, so it is hardly rotated even if a jig like tweezers is used. Even if it can be rotated, very high technique is necessary to perform a delicate adjustment. Therefore, JP-A-2006-064886 discloses a structure in which a recess is formed at the periphery of the objective lens so that a jig is inserted in the recess so as to rotate the objective lens.

In addition, JP-A-H6-168456 discloses a structure in which a spacer with protrusions is used for attaching the objective lens. The protrusions are disposed every 90 degrees alternately on the front and the rear sides and are used for adjustment of a tilt angle of the objective lens.

However, if the recess is formed at the periphery of the objective lens as the invention shown in JP-A-2006-064886, a manufacturing process of the objective lens becomes complicated. If the recess is formed by a post process of the manufactured objective lens, stress or heat due to the post process may cause distortion in the objective lens, so it is difficult to maintain high accuracy of the objective lens. Since a complicated process or a manufacturing method is necessary, manufacturing cost may be increased.

In addition, in the case of the invention described in JP-A-H6-168456, flexibility of adjustment of a tilt angle of the objective lens is low. Therefore, it is difficult to adjust so that two objective lenses have substantially the same tilt degree. In addition, even if they can be adjusted, it is necessary to use many spacers. Therefore, cost increases and weight of the objective lens holder increases so that recording or reproducing accuracy of the optical pickup may be lowered. In addition, since weight of the objective lens holder increases, a larger force is necessary for supporting and driving it, resulting in increase of manufacturing cost and running cost.

SUMMARY OF THE INVENTION

An object of the present invention is to provide an optical pickup including two objective lenses having different numerical apertures, that can adjust a difference of optical axes of the objective lenses by a simple operation.

Another object of the present invention is to provide an optical pickup including two objective lenses having different numerical apertures, that can improve accuracy of recording or reproducing a plurality of optical disc media such as a CD, a DVD and a BD even if a manufacturing or assembling error occurs in the objective lens and the objective lens holder.

Still another object of the present invention is to provide an optical pickup and a manufacturing method for the optical pickup that can simplify manufacturing steps and reduce effort and time necessary for manufacturing and assembling, and can further reduce cost.

An optical pickup according to an embodiment of the present invention includes a first objective lens, a second objective lens having a numerical aperture different from that of the first objective lens, and an objective lens holder that holds the first objective lens and the second objective lens. The first objective lens is attached to the objective lens holder via a spacer. The spacer has a cylindrical shape, a lens supporting portion formed on an upper surface side thereof that receives the first objective lens, and an engaging portion formed on the upper surface. The objective lens holder has a first fixture hole that passes through from the lower surface to the upper surface to which the spacer with the first objective lens is attached, and a second fixture hole that passes through from the lower surface to the upper surface to which the second objective lens is fixed. The first fixture hole has a spacer supporting portion in which the spacer is inserted in a rotatable manner.

According to this structure, the spacer is rotated in the state inserted in the spacer supporting portion of the objective lens holder, so that tilt degree of the first objective lens can be adjusted. In addition, since only tilt degree of the first objective lens is adjusted, effort of adjusting tilt degree can be reduced so that effort and time necessary for manufacturing and assembling the optical pickup can be reduced.

In addition, since the first objective lens is attached to the objective lens holder via the spacer that is provided with the engaging portion, the first objective lens can be rotated easily for correcting aberration of the first objective lens. Therefore, it is not necessary to make the objective lens in a special shape for rotating the objective lens or to prepare a special jig for rotating the objective lens. As a result, the optical pickup can be manufactured easily at low cost.

Since tilt degree of the objective lens that is attached to one of the fixture holes can be adjusted, the objective lenses can be adjusted to have the same or substantially the same tilt degree even if accuracies of the one of the fixture holes and an attaching portion of the objective lens attached to the fixture hole, and accuracies of the other and an attaching portion of the objective lens attached to the other fixture hole are not high. Therefore, it is possible to record or reproduce information on different types of optical disc media (a CD, a DVD and a BD) accurately.

In a preferred embodiment of the present invention, a portion of the spacer that contacts with the spacer supporting portion is formed to have a small coefficient of friction. For example, the entire spacer may be made of resin, metal or the like having a small coefficient of friction, or a surface thereof may be treated so as to have a small coefficient of friction. Other methods for reducing sliding friction between the spacer and the spacer supporting portion can be adopted without limited to the above description.

In a preferred embodiment of the present invention, the engaging portion is a protrusion that protrudes from the upper surface of the spacer or a recessed hole.

In a preferred embodiment of the present invention, the objective lens holder is supported by elastic supporting members, and electric power is supplied via the elastic supporting members to a tracking coil and a focusing coil that are provided for driving the objective lens holder. Alternatively, the objective lens holder is supported in a slidable and rotatable manner by a rotating shaftw that passes through the objective lens holder.

An optical pickup according to another embodiment of the present invention includes an infrared laser light source that emits an infrared laser beam, a red laser light source that emits a red laser beam, a blue laser light source that emits a blue laser beam, a first objective lens that condenses the infrared laser beam or the red laser beam onto a recording surface of a CD medium or a DVD medium, a second objective lens that condenses the blue laser beam onto a recording surface of a Blu-ray Disc medium, an objective lens holder that holds the first objective lens and the second objective lens, and can move in a tracking direction and in a focusing direction, a tracking coil that generates a thrust force for moving the objective lens holder in the tracking direction, a focusing coil that generates a thrust force for moving the objective lens holder in the focusing direction, and elastic supporting members that support the objective lens holder in an elastic manner and are used for supplying electric power to the tracking coil and the focusing coil. The first objective lens is attached to the objective lens holder via a spacer. The spacer has a cylindrical shape, a lens supporting portion formed on an upper surface side thereof that receives the first objective lens, and a protrusion protruding from the upper surface, and it is made of resin having a small coefficient of friction, the objective lens holder has a first fixture hole that passes through from the lower surface to the upper surface to which the spacer with the first objective lens is attached, and a second fixture hole that passes through from the lower surface to the upper surface to which the second objective lens is fixed, and the first fixture hole has a spacer supporting portion in which the spacer with the first objective lens is inserted in a rotatable manner.

A manufacturing method for an optical pickup according to an embodiment of the present invention is for an optical pickup that includes a first objective lens, a second objective lens having a numerical apertures different from that of the first objective lens, and an objective lens holder that holds the first and the second objective lenses. The first objective lens is attached to an objective lens holder via a spacer, the spacer has a cylindrical shape, a lens supporting portion formed on an upper surface side thereof that receives the first objective lens, and an engaging portion formed on the upper surface, the objective lens holder has a first fixture hole that passes through from the lower surface to the upper surface to which the spacer is attached in a rotatable manner, and a second fixture hole that passes through from the lower surface to the upper surface to which the second objective lens is fixed, and the upper surface of the first fixture hole is provided with a spacer supporting portion in which the spacer holding the first objective lens is inserted in a rotatable manner. The spacer is classified into a plurality of ranks in accordance with a size of a tilt angle of a bottom surface of the lens supporting portion with respect to the lower surface, the objective lens holder is classified into a plurality of ranks in accordance with a size of a tilt angle of the bottom surface of the lens supporting portion that receives the spacer with respect to a plane perpendicular to the optical axis, and a tilt and aberration of the first objective lens are adjusted by selecting the ranks of the spacer and the objective lens holder.

According to this structure, since the objective lens holder and the spacer are classified in advance into ranks in accordance with their manufacturing accuracies, it is easy to adjust tilt degree of the first objective lens so as to close to tilt degree of the second objective lens. Thus, an optical pickup having high recording or reproducing accuracy can be manufactured without using a complicated adjustment device, jig, member or the like.

In a preferred embodiment of the present invention, concerning the spacer and the objective lens holder of the same rank, the size of the tilt angle of the bottom surface of the lens supporting portion with respect to the lower surface of the spacer is substantially the same as the size of the tilt angle of the bottom surface of the lens supporting portion with respect to the plane perpendicular to the optical axis.

In a preferred embodiment of the present invention, the spacer is inserted in the spacer supporting portion and is rotated in a state contacting with the bottom surface of the lens supporting portion so that the optical axis of the first objective lens is adjusted, and then it is fixed to the first fixture hole with adhesive.

A manufacturing method for an optical pickup according to another embodiment of the present invention is for an optical pickup that includes an infrared laser light source that emits an infrared laser beam, a red laser light source that emits a red laser beam, a blue laser light source that emits a blue laser beam, a first objective lens that condenses the infrared laser beam or the red laser beam onto a recording surface of a CD medium or a DVD medium, a second objective lens that condenses the blue laser beam onto a recording surface of a Blu-ray Disc medium, an objective lens holder that holds the first objective lens and the second objective lens, and can move in a tracking direction and in a focusing direction, a tracking coil that generates a thrust force for moving the objective lens holder in the tracking direction, a focusing coil that generates a thrust force for moving the objective lens holder in the focusing direction, and elastic supporting members that support the objective lens holder in an elastic manner and are used for supplying electric power to the tracking coil and the focusing coil, in which the first objective lens is attached to the objective lens holder via a spacer, the spacer has a cylindrical shape, a lens supporting portion formed on an upper surface side thereof that receives the first objective lens, and a protrusion protruding from the upper surface, and it is made of resin having a small coefficient of friction, the objective lens holder has a first fixture hole that passes through from the lower surface to the upper surface to which the spacer with the first objective lens is attached, and a second fixture hole that passes through from the lower surface to the upper surface to which the second objective lens is fixed, and the upper surface of the first fixture hole has a spacer supporting portion in which the spacer with the first objective lens is inserted in a rotatable manner. In the manufacturing method, the spacer is classified into a plurality of ranks of manufacturing accuracy in accordance with a size of a tilt angle of a bottom surface of the lens supporting portion with respect to the lower surface of the spacer, the objective lens holder is classified into ranks of the same number as the ranks of the spacer in accordance with a size of a tilt angle of the bottom surface of the lens supporting portion with respect to the plane perpendicular to the optical axis, concerning the spacer and the objective lens holder of the same rank, the size of the tilt angle of the bottom surface of the lens supporting portion with respect to the lower surface of the spacer is substantially the same as the size of the tilt angle of the bottom surface of the lens supporting portion with respect to the plane perpendicular to the optical axis, and the spacer and the objective lens holder of the same rank are combined, the spacer is inserted in the spacer supporting portion and is rotated in a state contacting with the bottom surface of the lens supporting portion so that a tilt of an edge surface and aberration of the first objective lens are adjusted, and then the spacer is fixed to the first fixture hole with adhesive.

The media supported by the optical pickup according to the present invention for recording or reproducing information include a CD medium, a DVD medium and a BD medium. The CD medium includes a CD-ROM medium, a CD-R medium, a CD-RW medium and the like, while the DVD medium includes a DVD-ROM medium, a DVD-R medium, a DVD+R medium, a DVD-RW medium, a DVD+RW medium, a DVD-RAM medium and the like.

DETAILED DESCRIPTION OF THE PREFERRED EMBODIMENTS

Figure 1:
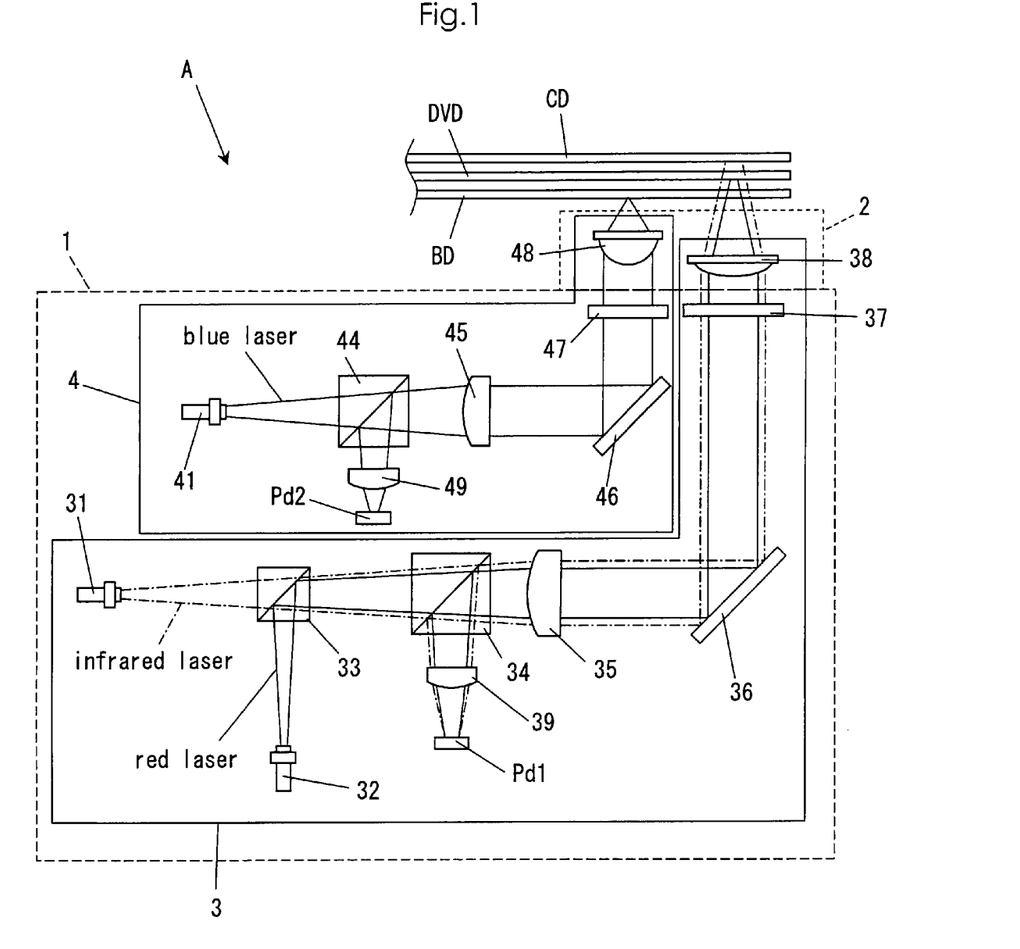
FIG. 1 is an arrangement plan showing a structure of an example of an optical pickup according to the present invention.

Hereinafter, an embodiment of the present invention will be described with reference to the attached drawings. FIG. 1 is an arrangement plan showing a structure of an example of an optical pickup according to the present invention. The optical pickup A shown in FIG. 1 includes a main body 1 and an actuator 2 that drives objective lenses. The optical pickup A shown in FIG. 1 includes a first optical system 3 for recording or reproducing information on a CD medium or a DVD medium, and a second optical system 4 for recording or reproducing information on a BD medium. As for the optical pickup shown in FIG. 1, an optical path of infrared laser is shown by a dashed dotted line, and an optical path of red laser is shown by a solid line, for convenience sake. In addition, an optical path of blue laser is also shown by a solid line. Here, the CD medium includes a CD-ROM medium, a CD-R medium, a CD-RW medium and the like, while the DVD medium includes a DVD-ROM medium, a DVD-R medium, a DVD+R medium, a DVD-RW medium, a DVD+RW medium, a DVD-RAM medium and the like.

The first optical system 3 includes at least an infrared laser light source 31, a red laser light source 32, a dichroic prism 33, a polarizing beam splitter 34, a collimator lens 35, an upstand mirror 36, a quarter wavelength plate 37, a first objective lens 38, a sensor lens 39 and a light receiving element Pd1.

The infrared laser light source 31 emits an infrared laser beam having a wavelength of approximately 780 nm, which is used for recording or reproducing information on a CD medium. The red laser light source emits a red laser beam having a wavelength of approximately 650 nm, which is used for recording or reproducing information on a DVD medium. The dichroic prism 33 is a prism that permits light having a wavelength in an infrared range to pass through and reflects light having a wavelength in red range. In other words, the laser beam emitted from the infrared laser light source 31 passes through the dichroic prism 33, while the laser beam emitted from the red laser light source 32 is reflected by a reflection plane of the dichroic prism 33 and goes out from the dichroic prism 33. Although the dichroic prism of the present invention has a structure in which the infrared laser beam passes through while the red laser beam is reflected, this structure should not be interpreted in a limiting manner.

The polarizing beam splitter 34 is a prism that pass or reflect an incident laser beam in accordance with a polarization direction thereof. In the present invention, the laser beams emitted from the infrared laser light source 31 and the red laser light source 32 and enter the polarizing beam splitter 34 pass through it, while the laser beam reflected by a recording surface of a CD medium or a DVD medium is reflected by the polarizing beam splitter 34. The collimator lens 35 converts the laser beam that is diverging light emitted from the infrared laser light source 31 or the red laser light source 32 as a point light source into parallel rays. The laser beam going out from the collimator lens 35 is reflected by the upstand mirror 36 to be in the orthogonal direction. In this way, the optical path of the laser beam becomes perpendicular to the recording surface of the CD medium or the DVD medium.

The quarter wavelength plate 37 converts incident light with linear polarization into light with circular polarization or converts incident light with circular polarization into light with linear polarization. As the first objective lens 38, an aspherical lens is adopted. The first objective lens 38 can condense the infrared laser beam to be a laser spot on the recording surface of the CD medium and condense the red laser beam to be a laser spot on the recording surface of the DVD medium.

The reflection laser beam reflected by the recording surface of the CD medium or the DVD medium enters the quarter wavelength plate 37 again. Thus, the reflection laser beam with the circular polarization is converted into a laser beam with linear polarization. The polarization direction of the laser beam after the conversion into linear polarization light is perpendicular to the polarization direction of the laser beam emitted from the infrared laser light source or the red laser light source. Therefore, the laser beam does not pass through the polarizing beam splitter 34 but is reflected by the same so as to enter the light receiving element Pd1 via the sensor lens 39. The light receiving element Pd1 converts the incident laser beam into an electric signal, which is used as an output signal for recording or reproducing information.

The second optical system 4 includes at least a blue laser light source 41, a polarizing beam splitter 44, a collimator lens 45, an upstand mirror 46, a quarter wavelength plate 47, a second objective lens 48, a sensor lens 49 and a light receiving element Pd2. The second optical system 4 is different from the first optical system 3 in that it includes the blue laser light source 41 that emits blue laser beam having a wavelength of approximately 405 nm as the laser light source and the second objective lens 48 as the objective lens but it does not include the dichroic prism 33. However, other structural elements are the same as those of the first optical system 3, so detailed description thereof will be omitted.

Among the optical elements described above, the first objective lens 38 of the first optical system 3 and the second objective lens 48 of the second optical system 4 are disposed in the actuator 2. The actuator 2 is attached to the main body 1.

Figure 2:
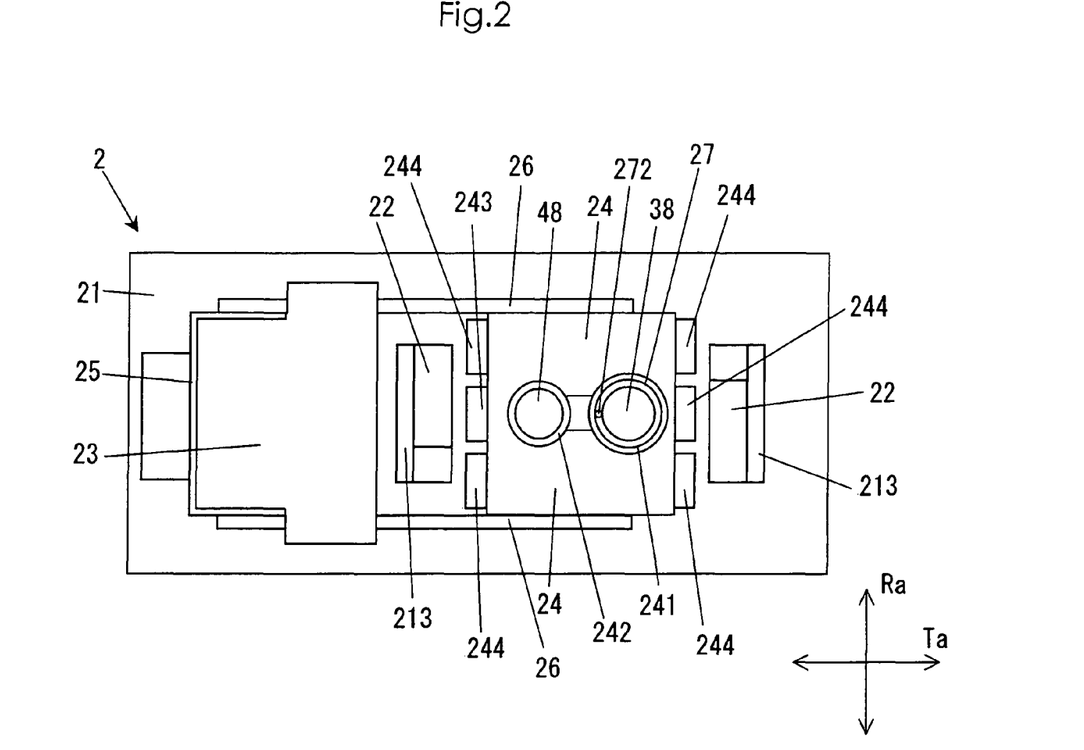
FIG. 2 is a plan view of an example of an actuator that is provided to the optical pickup according to the present invention.
Figure 3:
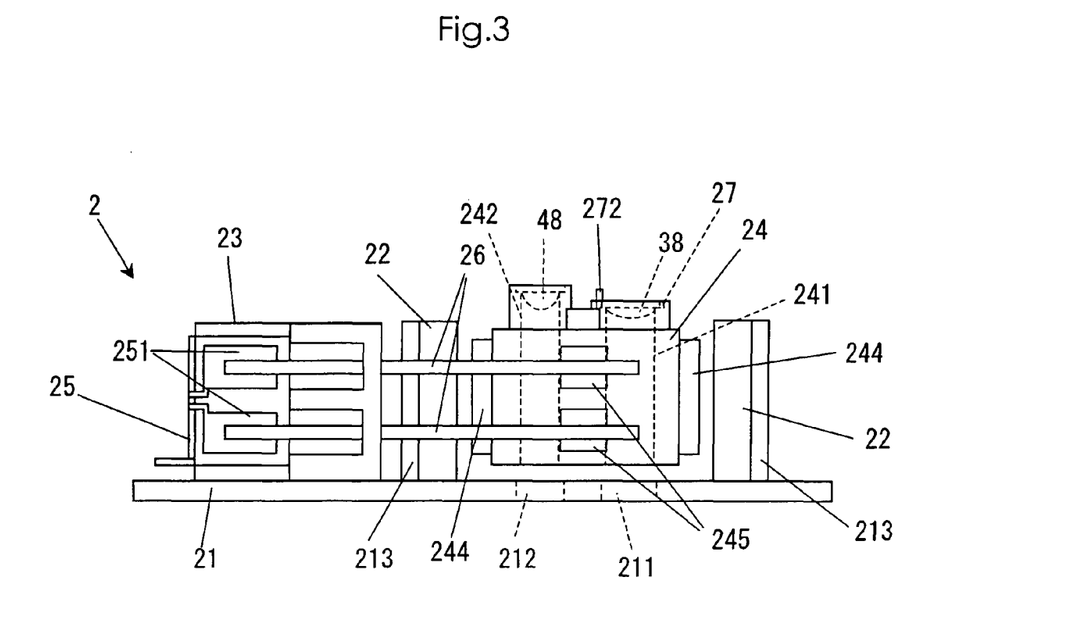
FIG. 3 is a front view of the actuator shown in FIG. 2.
Figure 4:
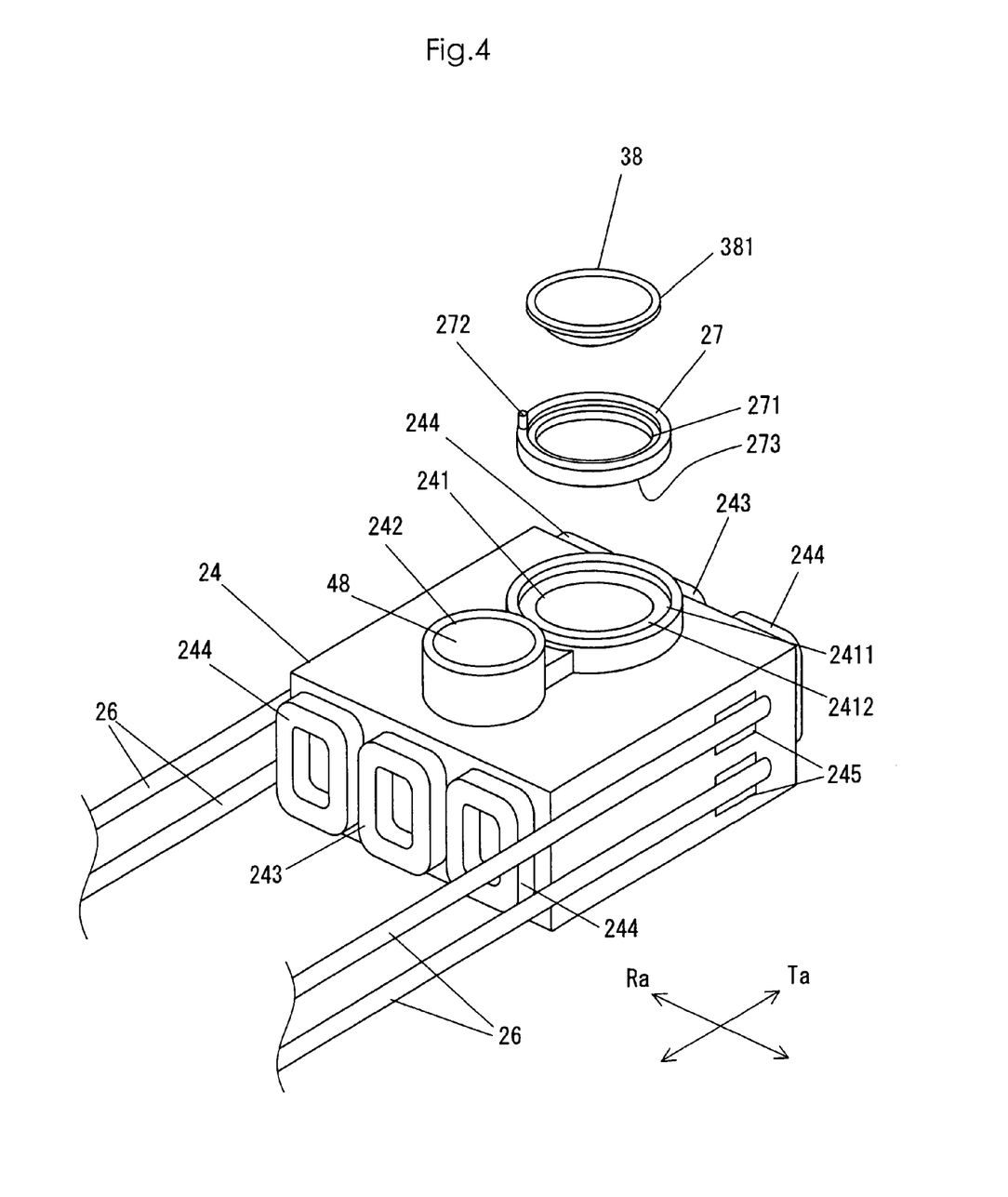
FIG. 4 is an enlarged perspective view of an objective lens holder that is used for the actuator shown in FIG. 2.

FIG. 2 is a plan view of an example of the actuator provided to the optical pickup according to the present invention, FIG. 3 is a front view of the actuator shown in FIG. 2, and FIG. 4 is an enlarged perspective view of the objective lens holder used in the actuator shown in FIG. 2. The actuator 2 includes an actuator base 21, a permanent magnet 22, a supporting member 23, an objective lens holder 24 that holds the first objective lens 38 and the second objective lens 48, a power circuit board 25, wire springs 26 and a spacer 27. Reference Ra in FIG. 2 denotes a radial direction of the optical disc medium (a CD medium, a DVD medium and a BD medium), while reference Ta denotes a tangential direction (circumferential direction) of the same. As shown in FIGS. 2 and 4, the first objective lens 38 and the second objective lens 48 are arranged side by side in the Ta direction of the optical pickup A.

The actuator base 21 is formed by stamping and pressing metal sheet. The actuator base 21 has a first through hole 211 for the infrared laser beam or the red laser beam to pass through, a second through hole 212 for the blue laser beam to pass through, and a magnet retaining portion 213 that retains the permanent magnet 22 and works as a back yoke. The permanent magnet 22 generates a magnetic field that acts upon the objective lens holder 24 and is made up of a neodymium magnet though it is not limited to. The supporting member 23 is made of a resin and is fixed securely to the actuator base 21 by using a bolt (not shown). In addition, other means such as engagement, welding, adhesion or the like can be adopted instead of the bolt for fixing the supporting member 23 to the actuator base 21 so that the former is not removed or shifted from the latter.

The objective lens holder 24 includes a first fixture hole 241 passing through from the lower surface to the upper surface to which the spacer 27 with the first objective lens 38 is fixed at the upper surface end, a second fixture hole 242 passing through from the lower surface to the upper surface to which the second objective lens 48 is fixed, a focusing coil 243 for moving the objective lens holder 24 in the optical axis direction, a tracking coil 244 for moving the objective lens holder 24 in the radial direction of the optical disc, and connection terminals 245 for supplying electric power to the focusing coil 243 and the tracking coil 244.

The power circuit board 25 is a FPC (Flexible Print Circuit) having flexibility in this example, which is adhered to the supporting member 23 so as to cover about a half thereof. Other material can be adopted for the power circuit board 25 instead of the FPC, which can be attached to the supporting member 23 stably. The power circuit board 25 is provided with terminal portions 251 for supplying electric power.

The objective lens holder 24 is supported by the supporting member 23 via the wire springs 26 so that bottom portion thereof does not contact with the actuator base 21. The wire springs 26 are elastic members having conductivity, which are fixed so as to contact with the connection terminals 245 of the objective lens holder 24. In addition, the wire springs 26 contact with the terminal portions 251 of the power circuit board 25 that are fixed to the supporting member 23. In this way, the terminal portions 251 are connected electrically with the connection terminals 245 via the wire springs 26, so that electric power is supplied from the power circuit board 25 to the focusing coil 243 and the tracking coil 244 via the wire springs 26.

Figure 5:
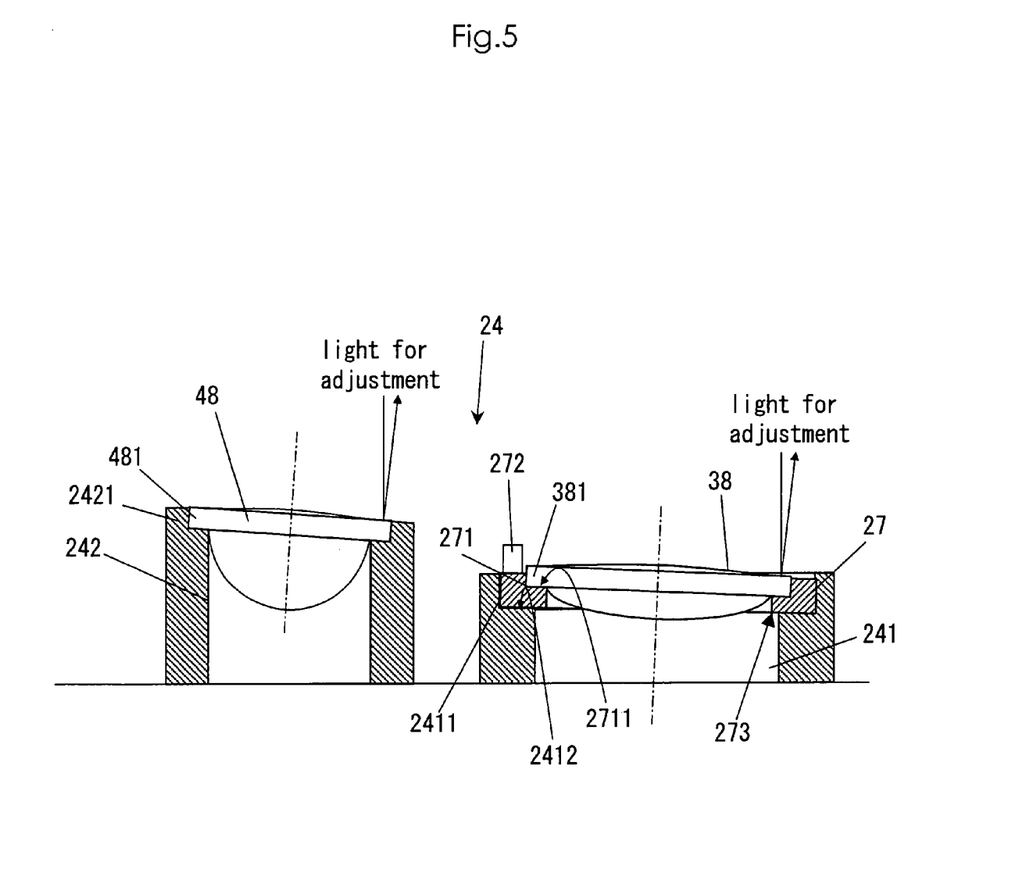
FIG. 5 is a cross sectional view of an objective lens mounting portion of the objective lens holder.

The objective lens holder 24 will be described more in detail. FIG. 5 is a cross sectional view of an objective lens mounting portion of the objective lens holder. As for the objective lens holder 24 shown in FIG. 5, the mounting portion of the second fixture hole 242 is tilted due to an error or the like, so the second objective lens 48 is mounted in the state where its optical axis is tilted. FIG. 5 shows the tilt in an exaggerated manner for easy recognition. As shown in FIG. 5, the first objective lens 38 and the second objective lens 48 have a flange-like retained portion 381 and a flange-like retained portion 481, respectively.

The first objective lens 38 for recording or reproducing information on a CD medium or a DVD medium and the second objective lens 48 for recording or reproducing information on a BD medium are mounted on the objective lens holder 24. The second objective lens 48 has a larger numerical aperture (NA=0.85) and a shorter focal length than the first objective lens 38 does. Therefore, as shown in FIGS. 4 and 5 and the like, the first fixture hole 241 and the second fixture hole 242 are formed so that the mounting position of the second objective lens 48 is closer to the optical disc than the mounting position of the first objective lens 38.

As shown in FIG. 5, the second fixture hole 242 is provided with a cylindrical step portion 2421 in which the second objective lens 48 can be inserted. The periphery portion of the second objective lens 48 is provided with the flange-like retained portion 481. The cylindrical step portion 2421 of the second fixture hole 242 is engaged with the retained portion 481 of the second objective lens 48, and the cylindrical step portion 2421 is bonded to the retained portion 481 by adhesive. Although it is not shown in the drawings, the upper end portion of the cylindrical step portion 2421 is provided with an inlet recess for injecting adhesive, so that adhesive is injected from the inlet recess for fixing a side circumference portion of the retained portion 481 is fixed to the second fixture hole 242 by adhesive. It is preferable to use adhesive that can fix the second objective lens 48 to the cylindrical step portion 2421 securely and hardly cause a malfunction such as deformation or break of the second objective lens 48 due to a stress generated by curing condition (heat or the like) or contraction when it is cured. Although it is not limitation, an ultraviolet curing adhesive is adopted in this example.

Figure 6:
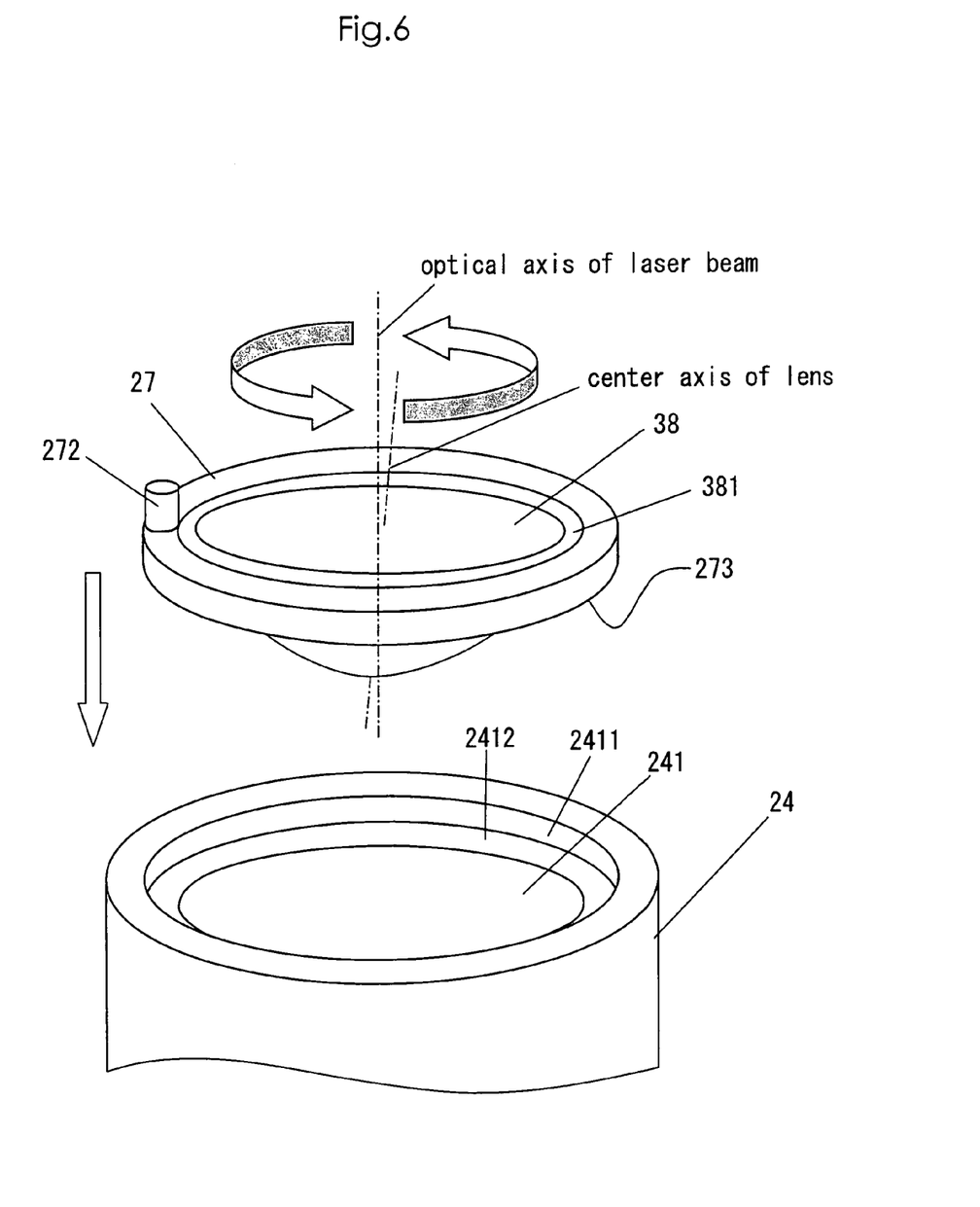
FIG. 6 is an exploded perspective view showing attachment of a first objective lens and a spacer to the objective lens holder shown in FIG. 5.
Figure 7:
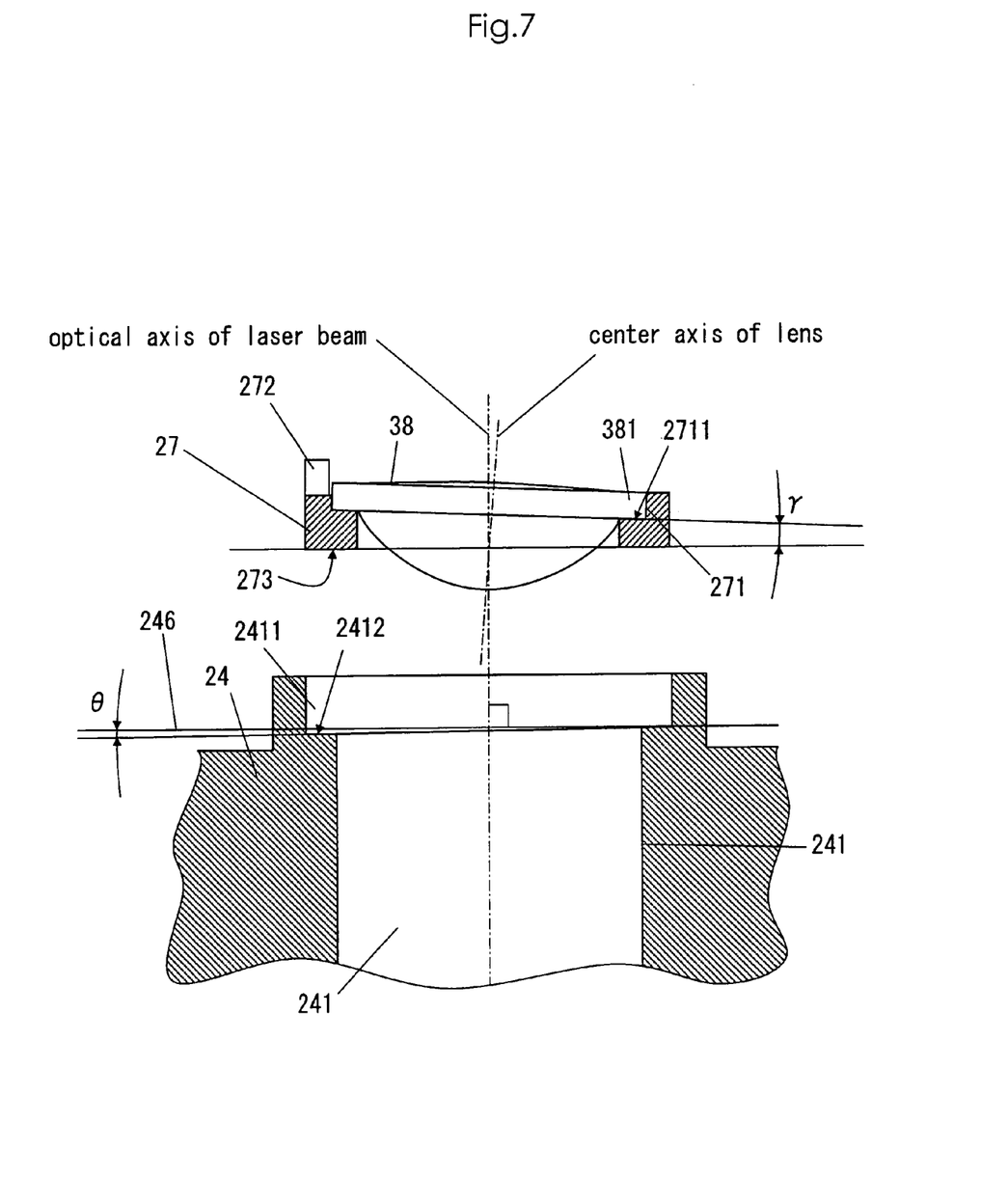
FIG. 7 is a cross sectional view of the first objective lens and the spacer shown in FIG. 6 in the exploded state.

FIG. 6 is an exploded perspective view showing the state attaching first objective lens and the spacer to the objective lens holder shown in FIG. 5, and FIG. 7 is a cross sectional view showing an exploded state of the first objective lens and the spacer shown in FIG. 6. As shown in FIGS. 5, 6 and 7, the spacer 27 has a cylindrical shape and includes an objective lens supporting portion 271 with a step in which the first objective lens 38 inserted, and a protrusion 272 that protrudes from the upper surface. The spacer 27 is formed integrally of resin having high sliding property (having a small coefficient of friction) in this example although it is not limitation. The flange-like retained portion 381 is formed on the periphery of the first objective lens 38, and the lower surface of the retained portion 381 contacts with a bottom surface 2711 of the objective lens supporting portion 271 so that the first objective lens 38 is supported by the spacer 27. In this state, adhesive is injected in a recess for injecting adhesive provided to the spacer 27 (not shown), so that the first objective lens 38 is bonded and fixed to the spacer 27.

The first fixture hole 241 is provided with a spacer supporting portion 2411 with a step in which the spacer 27 is inserted. The spacer supporting portion 2411 has a bottom surface 2412 that contacts with a lower surface 273 of the spacer 27. The spacer 27 is inserted in the spacer supporting portion 2411 so that the lower surface 273 contacts with the bottom surface 2412 of the spacer supporting portion 2411.

The bottom surface 2711 of the objective lens supporting portion 271 has a tilt angle ($\gamma$ degrees) with respect to the lower surface 273 of the spacer 27 due to a process tolerance in the manufacturing process, a manufacturing error, an assembling error or the like. In addition, the bottom surface 2412 of the spacer supporting portion 2411 of the objective lens holder 24 also has a tilt angle ($\theta$ degrees) with respect to the plane (246 in FIG. 7) orthogonal to the optical axis of the laser beam, due to a process tolerance in the manufacturing process, a manufacturing error, an assembling error or the like (see FIG. 7).

The retained portion 381 of the objective lens 38 is set to engage the objective lens supporting portion 271 of the spacer 27, which are bonded to each other by adhesive and are inserted in the spacer supporting portion 2411 of the objective lens holder 24. The protrusion 272 provided to the spacer 27 is caught with a jig (not shown) or the like, and the spacer 27 is rotated as shown by arrows in FIG. 6. Although FIG. 6 shows the state where the spacer 27 is separated from the objective lens holder 24 for convenience sake of description, the above-mentioned rotation is actually performed in the state where the spacer 27 is inserted in the spacer supporting portion 2411 of the objective lens holder 24 when the objective lens holder 24 is assembled.

This rotation enables cancellation or amplification between the tilt angle $\gamma$ of the bottom surface 2711 of the objective lens supporting portion 271 with respect to the lower surface 273 of the spacer 27 and the tilt angle $\theta$ of the bottom surface 2412 of the spacer supporting portion 2411 of the objective lens holder 24. Utilizing this action of cancellation or amplification, the tilt angle of the first objective lens 38 can be adjusted in the Ta direction and in the Ra direction. After finishing the adjustment of the tilt angle of the first objective lens 38, adhesive may be injected in a recess groove (not shown) formed on the inner peripheral portion of the spacer supporting portion 2411 so that the spacer 27 is fixed to the first fixture hole 241.

Here, the tilt (tilt degree) of the first objective lens 38 is adjusted to be the same as the tilt degree of the second objective lens 48 fixed to the second fixture hole 242. Thus, if the actuator 2 with the objective lens holder 24 is attached to the main body 1 of the optical pickup A so that the optical axis of the second objective lens 48 becomes perpendicular to a recording surface of a BD medium, the optical axis of the first objective lens 38 also becomes perpendicular to a recording surface of a CD medium or a DVD medium. Thus, occurrence of coma aberration due to the shift of tilt degree of the first objective lens 38 can be reduced.

When the tilt degree of the first objective lens 38 is adjusted, light for adjustment is projected to the first objective lens 38 and the second objective lens 48 by using an autocollimator, and reflection light reflected by their edge surface is received for the adjustment (see FIG. 5).

In this way, since the tilt degree of the first objective lens 38 is adjusted to be the same or substantially the same as the tilt degree of the second objective lens 48, the optical axes of the infrared laser beam, the red laser beam and the blue laser beam become parallel to each other. Thus, if the actuator 2 is arranged so that the blue laser beam going out from the second objective lens 48 becomes perpendicular to the recording surface of the BD medium, the infrared laser beam or the red laser beam going out from the first objective lens 38 becomes perpendicular or substantially perpendicular to the recording surface of the CD medium or the recording surface of the DVD medium. Thus, only if the actuator 2 is arranged to match the tilt degree of the second objective lens 48, the first objective lens 38 also has an appropriate tilt degree with respect to the CD medium and the DVD medium. Therefore, it is possible to support a BD, a DVD and a CD only by adjusting the actuator. As a result, effort and time necessary for assembling and adjustment can be reduced, so it is possible to reduce a cost necessary for manufacturing and assembling.

In addition, since the tilt degree of the first objective lens 38 can be adjusted, a variation in relative tilt degree between the first objective lens 38 and the second objective lens 48 can be decreased even if manufacturing accuracies of the first objective lens 38, the second objective lens 48, the first fixture hole 241, the second fixture hole 242 and the spacer are not high. Thus, it is possible to reduce cost largely for manufacturing and assembling the optical pickup that can record or reproduce information on a CD medium, a DVD medium and a BD medium with high accuracy.

Figure 8A:
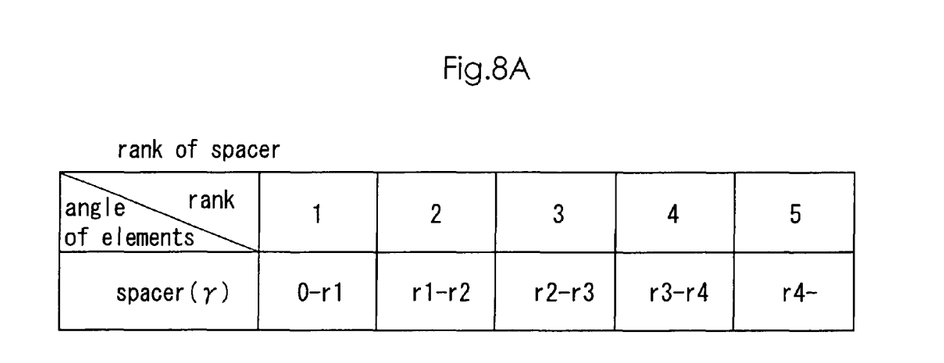
FIG. 8A is a table of classification of the spacer into ranks of accuracy of an angle γ.
Figure 8B:
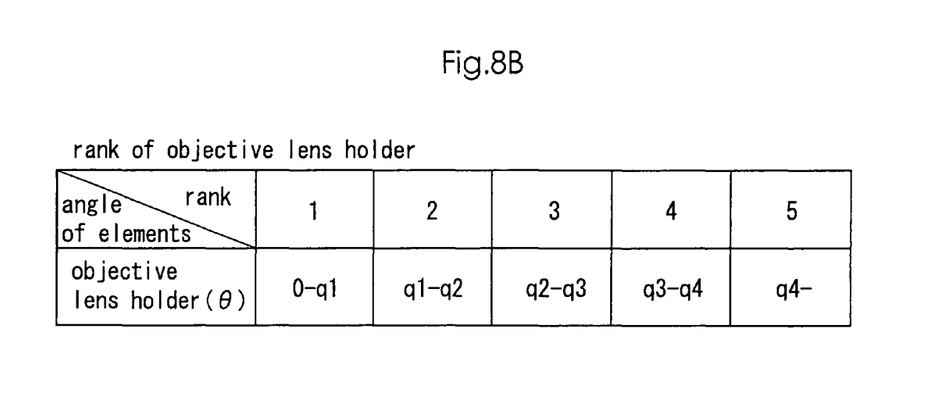
FIG. 8B is a table of classification of the objective lens holder into ranks of accuracy of an angle θ.

FIG. 8A is a table of classification of the spacer into ranks of accuracy of the angle of the bottom surface of the objective lens supporting portion with respect to the lower surface, and FIG. 8B is a table of classification of the objective lens holder into ranks of accuracy of the angle of the bottom surface of the spacer supporting portion of the objective lens holder with respect to the plane orthogonal to the optical axis of the laser beam. The spacer 27 is designed so that the lower surface 273 and the bottom surface 2711 of the objective lens supporting portion 271 are parallel to each other, so the angle should be zero degree in the design. However, there may be a little angle due to an accuracy of the process. Therefore, as shown in FIG. 8A, the angle $\gamma$ of the bottom surface 2711 with respect to the lower surface 273 is measured when the spacer 27 is manufactured, so that the spacers 27 are classified into five ranks in accordance with the angle. In the classification shown in FIG. 8A, Rank 1 has a high accuracy while Rank 5 has a low accuracy.

As shown in the rank table of FIG. 8A, manufactured spacers 27 are classified into five ranks including Rank 1 in which the angle $\gamma$ is within the range of 0-r1 degrees, Rank 2 in which the angle $\gamma$ is within the range of r1-r2 degrees, and the like. In addition, Rank 5 has the angle $\gamma$ that is r4 degrees or more.

Further as shown in the rank table of FIG. 8B, manufactured objective lens holders 24 are classified into five ranks including Rank 1 in which the angle $\theta$ is within the range of 0-q1, Rank 2 in which the angle $\theta$ is within the range of q1-q2, and the like. In addition, Rank 5 has the angle $\theta$ that is q4 or more.

For example, if r1 and q1, r2 and q2, r3 and q3, as well as r4 and q4 are equal to each other, the angle $\gamma$ of the spacer 27 in the Rank 1 is substantially the same as the angle $\theta$ of the objective lens holder 24 in the Rank 1. In this way, the spacer 27 is inserted in the spacer supporting portion 2411 of the objective lens holder 24 of the same rank and is rotated, so that the optical axis of the first objective lens 38 is arranged to be substantially parallel to the optical axis of the laser beam.

In addition, it is possible to select the spacer 27 of an appropriate rank in accordance with tilt degree of the second objective lens 48. In this case, it is possible to perform the adjustment only by rotating the spacer 27, so that tilt degree of the first objective lens 38 becomes substantially the same as tilt degree of the second objective lens 48. Thus, workability of assembling the optical pickup A can be improved.

Although r1 and q1, r2 and q2, r3 and q3, as well as r4 and q4 are the same to each other, respectively in the above-mentioned example, the present invention is not limited to this example. It is possible to set different distributions between the angle $\gamma$ and the angle $\theta$ that are used for the classification. In this case, the rank of the spacer 27 can be determined based on the rank of the objective lens holder 24 and tilt degree of the second objective lens 48 attached to the objective lens holder 24.

In addition, although each of the spacer 27 and the objective lens holder 24 is classified into five ranks in the example described above, the present invention is not limited to this example. It is possible to classify them into fewer ranks or more ranks. In addition, the number of ranks may be different between the spacer 27 and the objective lens holder 24.

Figure 9:
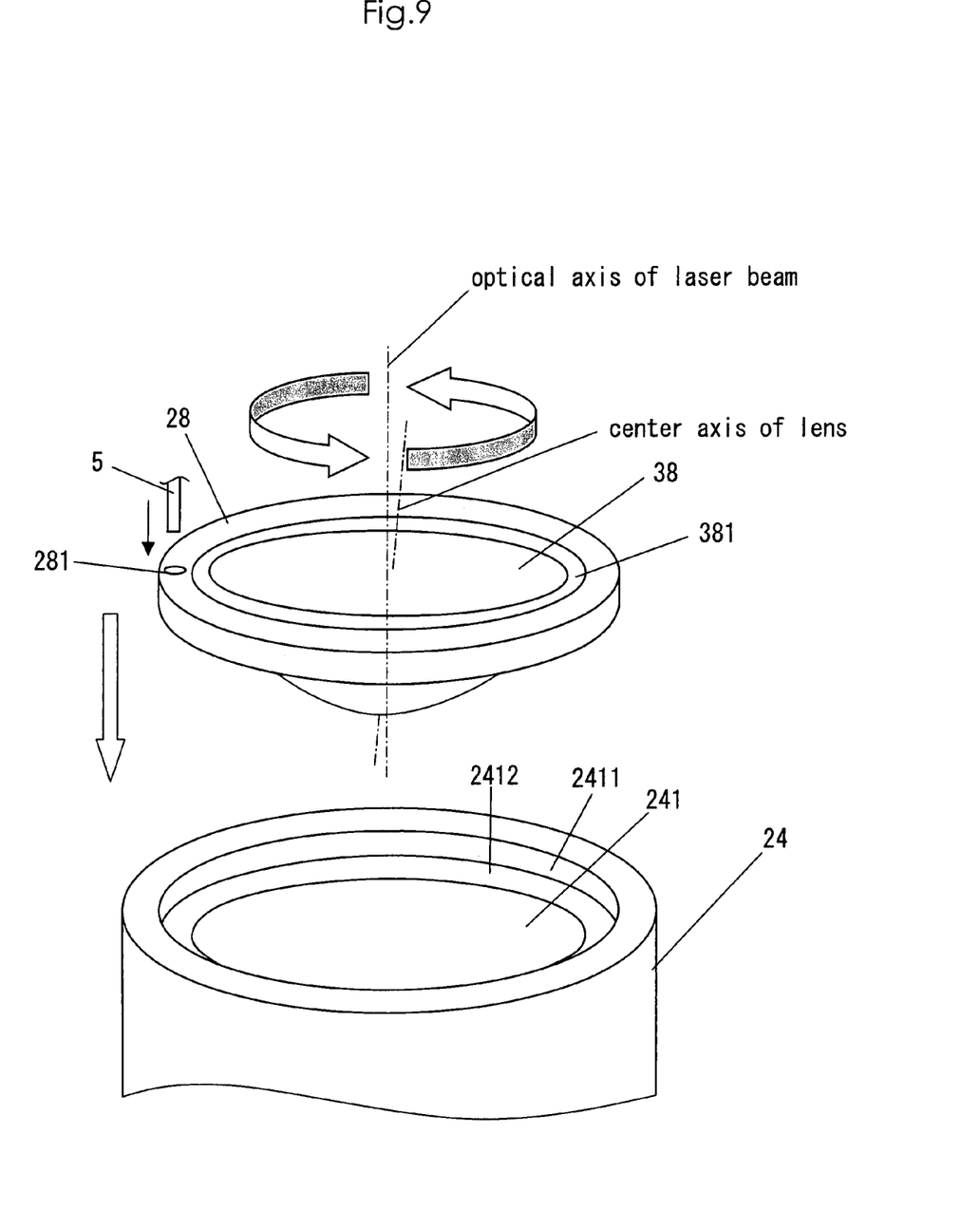
FIG. 9 is an exploded perspective view showing attachment of the first objective lens and the spacer to the objective lens holder in another example according to the present invention.

FIG. 9 is an exploded perspective view showing attachment of the first objective lens and the spacer to the objective lens holder in another example according to the present invention. The optical pickup shown in FIG. 9 has substantially the same structure as the optical pickup shown in FIG. 6 except for a spacer 28. Substantially the same members are denoted by the same reference signs.

The spacer 28 shown in FIG. 9 has a recessed hole 281 formed on the upper surface as an engaging portion. After inserting and fixing the first objective lens 38 to the spacer 28, the spacer 28 is inserted in the spacer supporting portion 2411 formed at the first fixture hole 241 of the objective lens holder 24. Then, the spacer 28 is rotated so as to adjust tilt degree of the first objective lens 38. In this case, a jig 5 such as a pin is inserted in the recessed hole 281 and a force is applied thereto so that the spacer 28 can be rotated easily. In addition, since the jig 5 is inserted in the recessed hole 281 for rotating the spacer 28, good workability is obtained.

Figure 10:
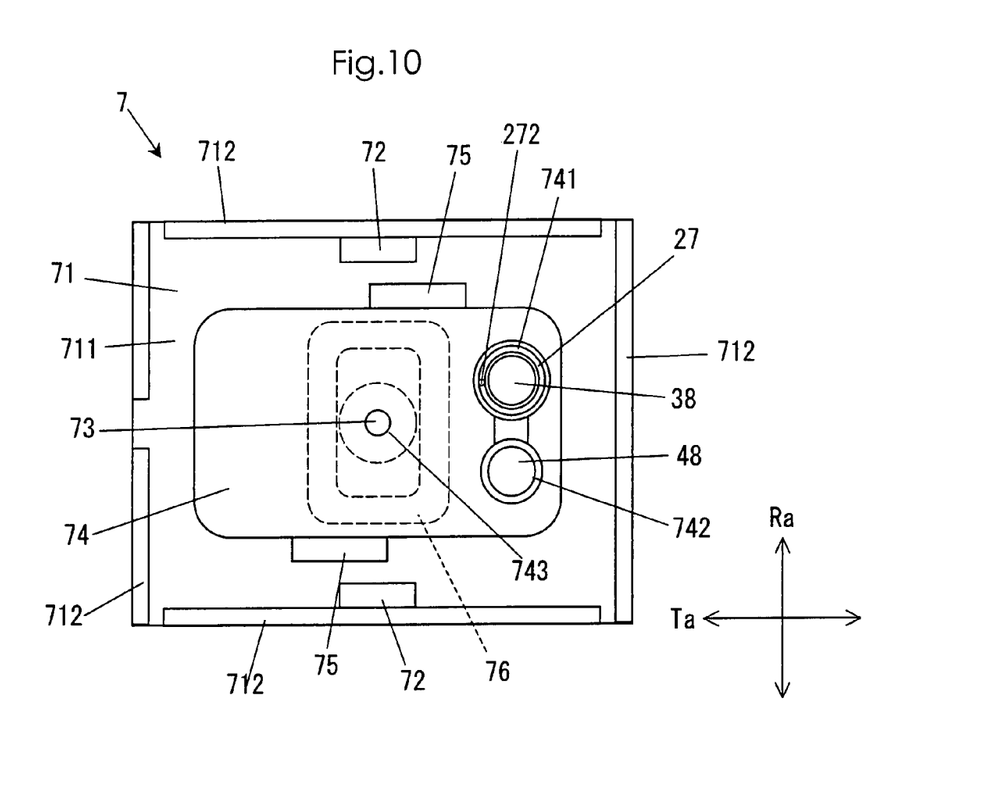
FIG. 10 is a plan view showing another example of the actuator that is used in the optical pickup according to the present invention.
Figure 11:
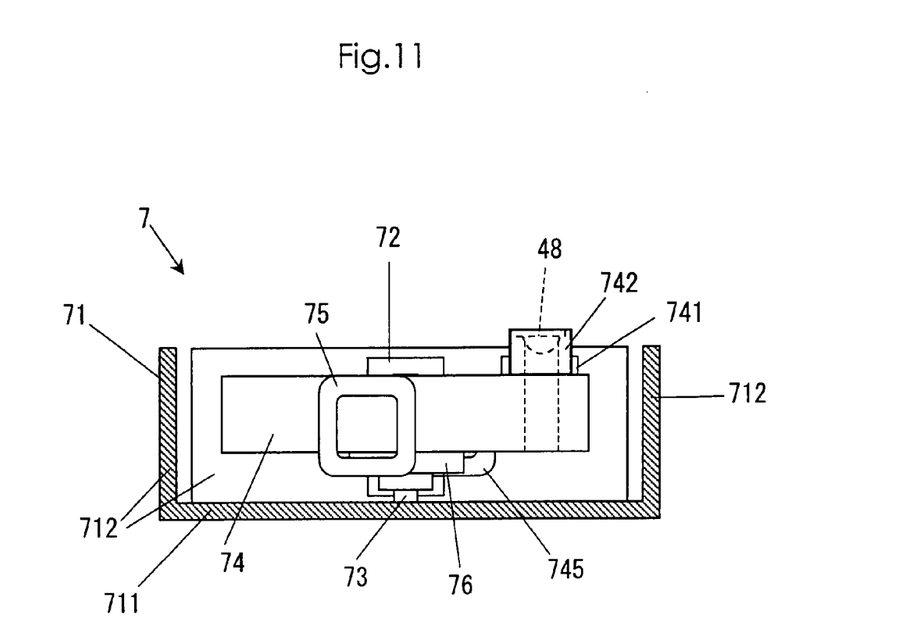
FIG. 11 is a cross sectional view of the actuator shown in FIG. 10.
Figure 12:
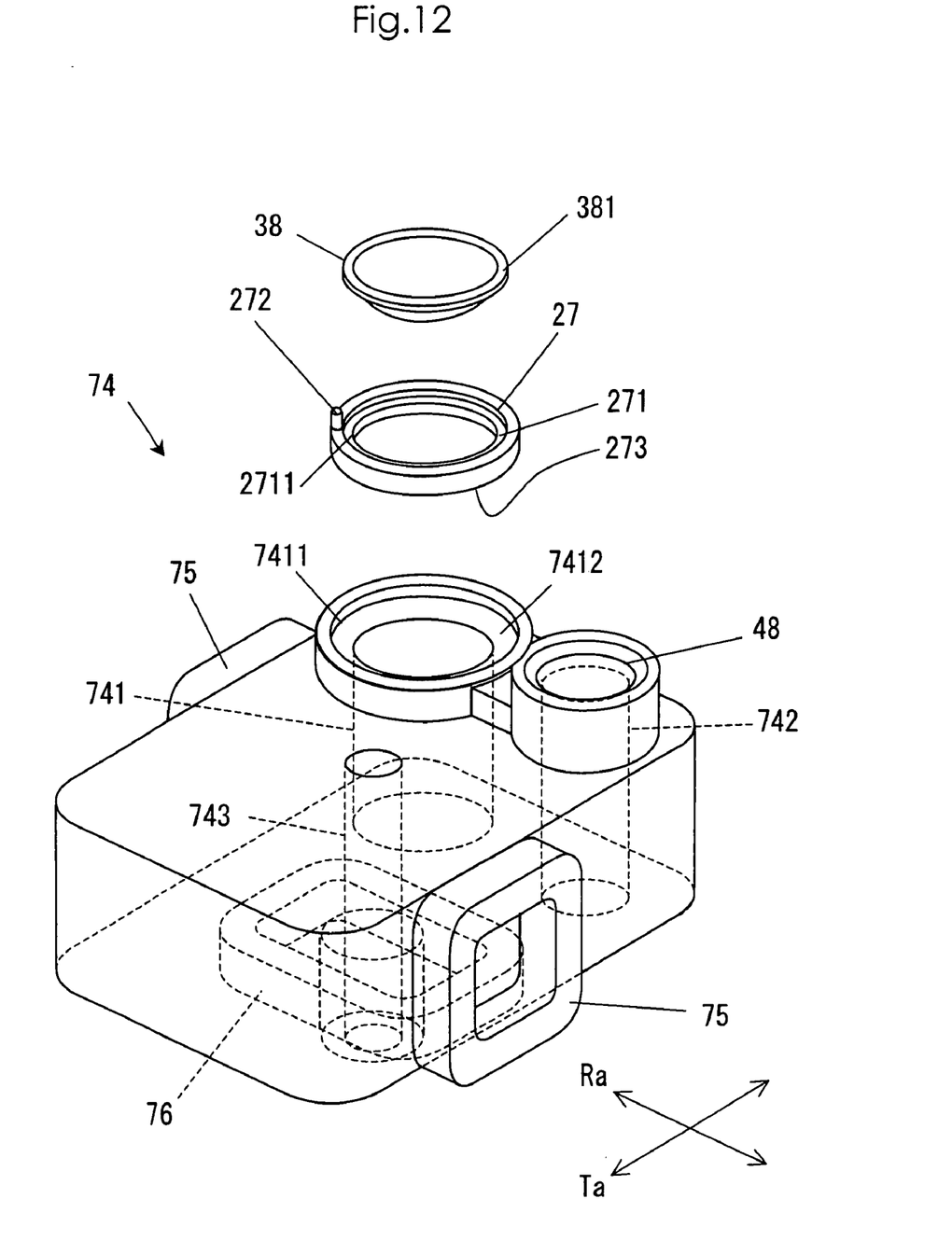
FIG. 12 is a perspective view of the objective lens holder that is used in the actuator shown in FIG. 10.

FIG. 10 is a plan view showing another example of the actuator that is used in the optical pickup according to the present invention, FIG. 11 is a cross sectional view of the actuator shown in FIG. 10, and FIG. 12 is a perspective view of the objective lens holder that is used in the actuator shown in FIG. 10. An actuator 7 shown in FIGS. 10 and 11 are attached to a shaft 73 that is fixed to an actuator base 71 in a slidable and rotatable manner.

The actuator 7 shown in FIGS. 10 and 11 includes the actuator base 71, permanent magnets 72, the shaft 73, an objective lens holder 74 that holds the first objective lens 38 and the second objective lens 48, tracking coils 75 and a focusing coil 76. In FIG. 10, reference Ra indicates the radial direction of an optical disc medium (a CD medium, a DVD medium or a BD medium), and reference Ta indicates the tangential direction (circumferential direction). As shown in FIGS. 10 and 11, the first objective lens 38 and the second objective lens 48 are arranged side by side in the Ra direction in the actuator 7.

The actuator base 71 has a rectangular shape viewed from the top, which includes a bottom portion 711 and upstand portions 712 upstanding perpendicularly to the bottom portion 711 from the edges of the bottom portion 711. There is provided a cylindrical shaft 73 protruding from substantially the middle portion of the bottom portion 711 in the same direction as the upstand portions 712. The upstand portions 712 are provided with two permanent magnets 72 arranged to face each other with the shaft 713 between them (the number of permanent magnets is not limited to two).

As shown in FIG. 12, the objective lens holder 74 has a first fixture hole 741 to which the spacer 27 the first objective lens 38 is attached, a second fixture hole 742 to which the second objective lens 48 is attached, a shaft hole 743 for the shaft 73 to pass through the main body at substantially the middle thereof, the focusing coil 76 arranged to surround the shaft hole 743, the tracking coils 75 arranged on side surfaces to face each other with the shaft hole 743 between them, and a magnetic plate (not shown) arranged on the lower surface of the focusing coil 76.

The first fixture hole 741 is provided with a spacer supporting portion 7411 with a step in which the spacer 27 is inserted. The spacer supporting portion 7411 has a bottom surface 7412 that contacts with the lower surface 273 of the spacer 27. The spacer 27 is inserted in the spacer supporting portion 7411 so that the lower surface 273 contacts with the bottom surface 7412 of the spacer supporting portion 7411.

The objective lens holder 74 may be classified into ranks of manufacturing accuracy when the objective lens holder 74 is used for assembling the optical pickup in the same manner as when the objective lens holder 24 is used for assembling the same. In this case, similarly to the case of the objective lens holder 24, the classification may be performed in accordance with accuracy of tilt angle of the bottom surface 7412 of the spacer supporting portion 7411. In addition, although the spacer 27 shown in FIG. 6 and the like is used in this example, the spacer 28 shown in FIG. 9 can be used instead.

Although the spacers shown in FIGS. 6 and 9 are used for holding the first objective lens 38, the present invention is not limited to these spacers. It is possible to use other spacers having the structure that can be rotated by catching the engaging portion with a jig or the like.

In each example described above, the objective lens that is used for recording or reproducing information on a CD medium or a DVD medium is the first objective lens 38, and the objective lens that is used for recording or reproducing information on a BD medium is the second objective lens 48, so that the second objective lens 48 is fixed while tilt degree of the first objective lens 38 is adjusted. However, the present invention is not limited to this structure. It is possible to adopt the opposite structure in which the first objective lens 38 is fixed while tilt degree of the second objective lens 48 is adjusted. However, it is preferable to fix the objective lens for a BD medium (i.e., the second objective lens 48 in this example) that is sensible to variation of tilt degree (i.e., that is easy to cause coma aberration), and to adjust objective lens for a CD and a DVD that is not so sensible to variation of tilt degree (i.e., the first objective lens in this example) so as to match the second objective lens 48.

Although the first optical system for recording or reproducing a CD medium and/or a DVD medium and the second optical system for recording or reproducing a BD medium are disposed independently of each other in each example described above, the present invention is not limited to this structure. It is possible to adopt another structure in which a part of the optical system (e.g., from the polarizing beam splitter to the quarter wavelength plate) is shared by the first and the second optical system. In this case, it is necessary to provide a member that separates the laser beam after passing through the quarter wavelength plate so that the infrared laser beam and the red laser beam enter the first objective lens while the blue laser beam enters the second objective lens. However, the optical pickup can be downsized and the number of elements can be reduced by the sharing of a part of the optical system. Therefore, effort and time necessary for assembling and adjustment can be reduced, so that manufacturing cost can be reduced. In addition, the optical pickup can also be used for recording or reproducing information on an AOD (Advanced Optical Disc) using a blue laser beam and an objective lens having the same numerical aperture as the DVD medium.

Although the embodiment of the present invention is described above concretely, the present invention is not limited to the embodiment described above, which can be modified variously within the scope of the present invention without deviating from the spirit thereof. The optical pickup of the present invention may have a plurality of features described above in the embodiment.

What is claimed is:

1. An optical pickup, comprising:
a first objective lens; a second objective lens having a numerical aperture different from that of the first objective lens; and
an objective lens holder that holds the first objective lens and the second objective lens, characterized in that the first objective lens is attached to the objective lens holder via a spacer, the spacer has a cylindrical shape, a lens supporting portion formed on an upper surface side thereof that receives the first objective lens, and an engaging portion formed on the upper surface, the objective lens holder has a first fixture hole that passes through from the lower surface to the upper surface to which the spacer with the first objective lens is attached, and a second fixture hole that passes through from the lower surface to the upper surface to which the second objective lens is fixed, and the first fixture hole has a spacer supporting portion having a stepped shape so as to have a bottom surface, the spacer supporting portion supporting the spacer in a rotatable manner with a lower surface of the spacer kept in contact with the bottom surface.

2. The optical pickup according to claim 1, characterized in that a portion of the spacer that contacts with the spacer supporting portion is formed to have a small coefficient of friction.

3. The optical pickup according to claim 1, characterized in that the engaging portion is a protrusion that protrudes from the upper surface of the spacer.

4. The optical pickup according to claim 1, characterized in that the engaging portion is a recessed hole that is formed on the upper surface of the spacer.

5. The optical pickup according to claim 1, characterized in that the objective lens holder is supported by elastic supporting members, and electric power is supplied via the elastic supporting members to a tracking coil and a focusing coil that are provided for driving the objective lens holder.

6. The optical pickup according to claim 1, characterized in that the objective lens holder is supported in a slidable and rotatable manner by a rotating shaft that passes through the objective lens holder.

7. The optical pickup according to claim 1, characterized in that at least two types of optical disc media among a CD medium, a DVD medium and a BD medium can be supported as for recording or reproducing information.

8. An optical pickup, comprising:
an infrared laser light source that emits an infrared laser beam;
a red laser light source that emits a red laser beam;
a blue laser light source that emits a blue laser beam;
a first objective lens that condenses the infrared laser beam or the red laser beam onto a recording surface of a CD medium or a DVD medium;
a second objective lens that condenses the blue laser beam onto a recording surface of a Blu-ray Disc medium;

an objective lens holder that holds the first objective lens and the second objective lens, and can move in a tracking direction and in a focusing direction;

a tracking coil that generates a thrust force for moving the objective lens holder in the tracking direction;

a focusing coil that generates a thrust force for moving the objective lens holder in the focusing direction; and elastic supporting members that support the objective lens holder in an elastic manner and are used for supplying electric power to the tracking coil and the focusing coil, characterized in that the first objective lens is attached to the objective lens holder via a spacer, the spacer has a cylindrical shape, a lens supporting portion formed on an upper surface side thereof that receives the first objective lens, and a protrusion protruding from the upper surface, and it is made of resin having a small coefficient of friction, the objective lens holder has a first fixture hole that passes through from the lower surface to the upper surface to which the spacer with the first objective lens is attached, and a second fixture hole that passes through from the lower surface to the upper surface to which the second objective lens is fixed, and the first fixture hole has a spacer supporting portion having a stepped shape so as to have a bottom surface, the spacer supporting portion supporting the spacer in a rotatable manner with a lower surface of the spacer kept in contact with the bottom surface.

9. A manufacturing method for an optical pickup in which first and second objective lenses having different numerical apertures are attached to an objective lens holder, wherein the first objective lens is attached to an objective lens holder via a spacer, the spacer has a cylindrical shape, a lens supporting portion formed on an upper surface side thereof that receives the first objective lens, and an engaging portion formed on the upper surface, the objective lens holder has a first fixture hole that passes through from the lower surface to the upper surface to which the spacer is attached in a rotatable manner, and a second fixture hole that passes through from the lower surface to the upper surface to which the second objective lens is fixed, and the upper surface of the first fixture hole is provided with a spacer supporting portion in which the spacer holding the first objective lens is inserted in a rotatable manner, characterized in that the spacer is classified into a plurality of ranks in accordance with a size of a tilt angle of a bottom surface of the lens supporting portion with respect to the lower surface, the objective lens holder is classified into a plurality of ranks in accordance with a size of a tilt angle of the bottom surface of the lens supporting portion that receives the spacer with respect to a plane perpendicular to the optical axis, and a tilt of an edge surface and aberration of the first objective lens are adjusted by selecting the ranks of the spacer and the objective lens holder.

10. The manufacturing method for an optical pickup according to claim 9, characterized in that concerning the spacer and the objective lens holder of the same rank, the size of the tilt angle of the bottom surface of the lens supporting portion with respect to the lower surface of the spacer is substantially the same as the size of the tilt angle of the bottom surface of the lens supporting portion with respect to the plane perpendicular to the optical axis.

11. The manufacturing method for an optical pickup according to claim 9, characterized in that the spacer is inserted in the spacer supporting portion and is rotated in a state contacting with the bottom surface of the lens supporting portion so that the optical axis of the first objective lens is adjusted, and then it is fixed to the first fixture hole with adhesive.

12. The manufacturing method for an optical pickup according to claim 9, characterized in that at least two types of optical disc media among a CD medium, a DVD medium and a BD medium can be supported as for recording or reproducing information.

13. A manufacturing method for an optical pickup in which first and second objective lenses having different numerical apertures are attached to an objective lens holder, wherein the first objective lens is an objective lens that condenses an infrared laser beam emitted from an infrared laser light source and a red laser beam emitted from a red laser light source, the second objective lens is an objective lens that condenses a blue laser beam emitted from a blue laser light source, the first objective lens is attached to an objective lens holder via a spacer, the spacer has a cylindrical shape, a lens supporting portion formed on an upper surface side thereof that receives the first objective lens, and an engaging portion formed on the upper surface, the objective lens holder has a first fixture hole that passes through from the lower surface to the upper surface to which the spacer is attached in a rotatable manner, and a second fixture hole that passes through from the lower surface to the upper surface to which the second objective lens is fixed, and the upper surface of the first fixture hole is provided with a spacer supporting portion in which the spacer holding the first objective lens is inserted in a rotatable manner, characterized in that the spacer is classified into a plurality of ranks of manufacturing accuracy in accordance with a size of a tilt angle of a bottom surface of the lens supporting portion with respect to the lower surface of the spacer, the objective lens holder is classified into ranks of the same number as the ranks of the spacer in accordance with a size of a tilt angle of the bottom surface of the lens supporting portion with respect to the plane perpendicular to the optical axis, concerning the spacer and the objective lens holder of the same rank, the size of the tilt angle of the bottom surface of the lens supporting portion with respect to the lower surface of the spacer is substantially the same as the size of the tilt angle of the bottom surface of the lens supporting portion with respect to the plane perpendicular to the optical axis, and the spacer and the objective lens holder of the same rank are combined, the spacer is inserted in the spacer supporting portion and is rotated in a state contacting with the bottom surface of the lens supporting portion so that a tilt of an edge surface and aberration of the first objective lens are adjusted, and then the spacer is fixed to the first fixture hole with adhesive.

* * * * *